United States Patent [19]

Peirce

[11] Patent Number: 4,485,300
[45] Date of Patent: Nov. 27, 1984

[54] LOSS CONTROL SYSTEM
[75] Inventor: Roger Peirce, Los Altos, Calif.
[73] Assignee: Visa U.S.A., Inc., San Francisco, Calif.
[21] Appl. No.: 359,375
[22] Filed: Mar. 18, 1982
[51] Int. Cl.³ .............................................. G06K 5/00
[52] U.S. Cl. .................................... 235/380; 235/379
[58] Field of Search ............................. 235/379, 380

[56] References Cited
U.S. PATENT DOCUMENTS

| | | | |
|---|---|---|---|
| 3,818,187 | 6/1974 | Lovendusky | 235/380 |
| 3,982,103 | 9/1976 | Goldman | 235/380 |
| 3,985,998 | 10/1976 | Crafton | 235/380 |
| 3,996,450 | 12/1976 | Kerkhoff | 235/380 |
| 4,013,894 | 3/1977 | Foote | 235/380 |
| 4,114,140 | 9/1978 | Kubina | 235/380 |

Primary Examiner—Harold I. Pitts
Attorney, Agent, or Firm—Limbach, Limbach & Sutton

[57] ABSTRACT

A loss control system is disclosed wherein an issuer of bank cards can regulate the type of authorization requests transmitted thereto from a merchant. More particularly, a system is disclosed wherein each issuer maintains files relating to their cardholder. A data control center is linked to the files of each issuer, as well as to the merchants in the system. The data control center is provided with parameters, supplied by each issuer, for determining which authorization requests are to be forwarded to the issuer for approval. In use, merchants forward all transactions to the data control center. The data control center evaluates the requests against the parameters supplied by the associated issuer. The data control center will only forward requests to the issuer if they fall within the parameters defined by the issuer. Requests which are forwarded are evaluated by the issuer and an acknowledgment is sent back to the merchant through the data control center. The data control center will provide a response if the request is not forwarded. The use of the subject invention permits each issuer to tailor its authorization program to its unique credit and fraud problems.

11 Claims, 1 Drawing Figure

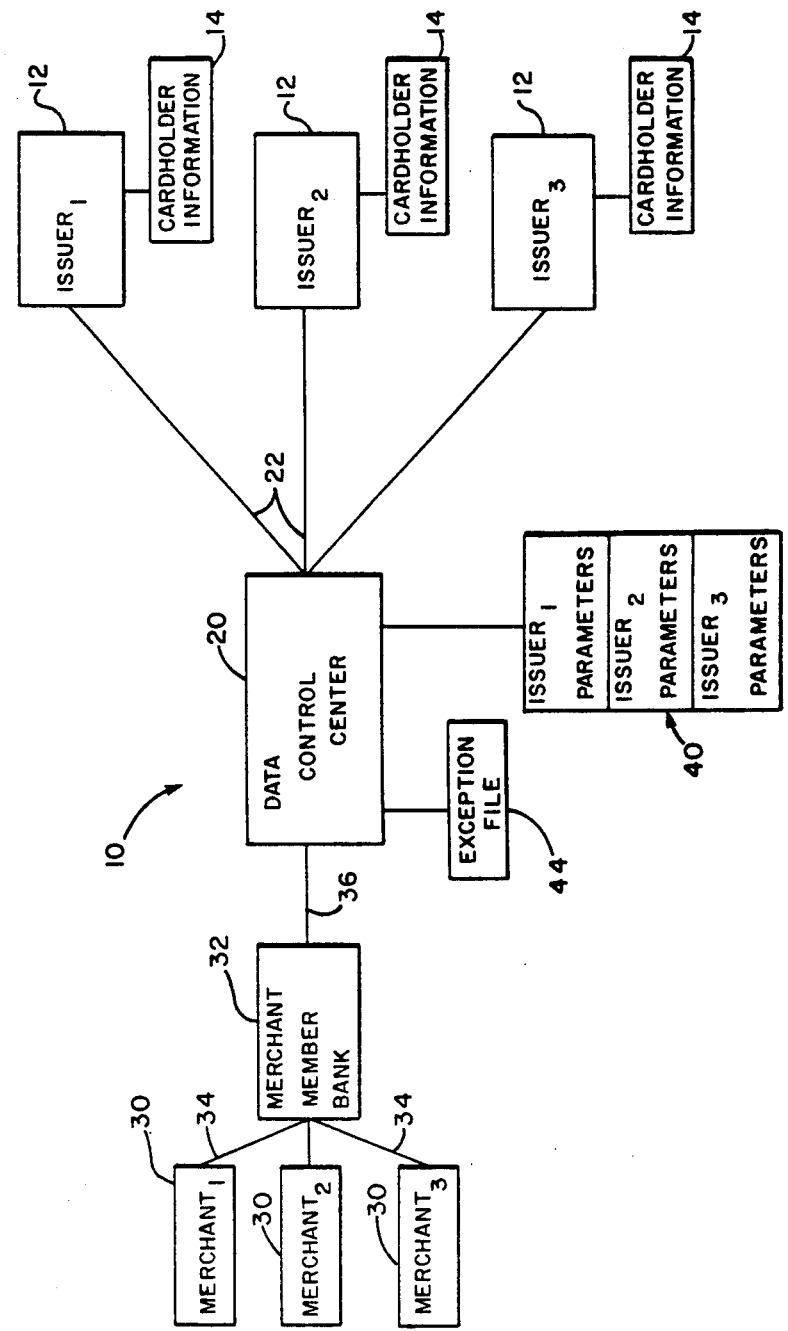

LOSS CONTROL SYSTEM

BACKGROUND OF THE INVENTION

The subject invention relates to a system for approving authorization requests made by a merchant regarding the credit worthiness or solvency of a cardholder. More particularly, a new and improved system is disclosed wherein the issuer of bank cards can control the circumstances when an authorization request from a merchant is forwarded to the issuer for approval. By this arrangement the issuer can regulate its authorization expenses and balance these expenses against potential credit and fraud losses.

In recent years, the use of bank cards to facilitate purchases without cash has been widespread. In a typical debit or credit card system, a potential user applies to an institution, generally a bank, for a card. This institution, called the issuer, will provide a bank card to the user if he meets certain financial requirements. The issuer then opens a file having account information on the cardholder. This file is continually updated and supplied with data concerning recent purchases and payments. As discussed below, the file kept on each customer is used to determine whether a particular purchase should be approved. The bank card can be used as a means for extending credit, or for debiting a deposit account funded by the customer.

The cardholder may purchase goods in any establishment which accepts that particular card. Each establishment, hereinafter referred to as the merchant, is generally associated with an intermediate institution. The intermediate institution, hereinafter referred to as the merchant member bank, is responsible for enlisting various merchants to accept the particular credit card for purchases.

In use, the cardholder presents his card to the merchant for payment of either goods or services. The merchant forwards a draft of the transaction of the merchant member bank for payment less a service charge. The merchant member bank in turn, presents the draft to the issuer bank for payment less a service charge. The issuer bank then bills the cardholder for the transaction amount. In the alternative, the cardholder can maintain an account at the issuer bank, and can have a debit card arrangement whereby the account can be debited by the issuer either at the time of the transaction or when the merchant member bank supplies the draft for payment.

Typically, the presentation of the draft and the payment by the issuer is accomplished electronically through a linked computer network. In order to facilitate the electronic transfer of funds, a data control center is utilized. More particularly, a data control center is provided which is electronically connected to a plurality of issuers. The control center is also connected to a plurality of merchant member banks. Thus, information passing between merchant member banks and the issuers is routed through the control center.

As can be appreciated, any funds transfer system must be protected in a variety of ways from credit and fraud losses. Thus, safeguards are typically provided to limit the use of lost or stolen bank cards. Further, the system usually includes methods for limiting the amount of purchases a customer is allowed to make in a given period of time. Even with protection, credit and fraud losses amount to hundreds of millions of dollars per year to the parties involved in the system.

In the prior art, there have been developed a variety of techniques for reducing losses. The simplest type of loss control system consists of the printing and distribution of a bulletin, listing the account numbers of lost or stolen bank cards. The bulletin, compiled using information supplied by the issuers, is distributed to the merchants. By checking the customer's account number against the list in the bulletin, the merchant can determine if a particular card can be accepted. However, the use of a bulletin as a loss control technique is undesirable for a number of reasons. For example, a number of days will elapse between the time a card is reported lost or stolen and the time that information is circulated to merchants. Further, the bulletin cannot be used to control the amount of purchases charged to one card in a given period of time.

Accordingly, various electronic loss control systems have been developed which permit immediate processing and entry of data relating to lost and stolen bank cards. The system may also be used to keep track of bank card activity in order to prevent overuse of the card. In a typical prior art system, before accepting the bank card for payment, a merchant will electronically forward a request for authorization to the merchant member bank. Generally the request for authorization is entered by the merchant into the system via a telephone or automatic terminal.

If the merchant member bank is, in fact, the issuer of the particular bank card, the authorization request can be handled internally. More particularly, the merchant member bank will check its account file for the cardholder and decide to approve or deny the transaction. In most cases however, the issuer of the card is different from the merchant member bank. In the latter situation, the merchant member bank electronically routes the request for authorization to the data control center. The data control center will then forward the request to the particular issuer of the bank card. The remote issuer can then check its account file on the cardholder to determine if the card has been reported lost or stolen or if the customer has exceeded his credit limits or depleted the funds in his deposit account. An acknowledgment, either approving or denying the transaction, is then transmitted back to the merchant through the data control center and the associated merchant member bank.

The cost of authorizing a transaction is borne by the issuer. These costs are a function of computer processing time and data transmission fees. As can be appreciated, these costs can be relatively high due to the large number of purchases made every day. In fact, if an issuer had to approve every transaction, authorization expenses would exceed losses related to fraud.

One method of balancing authorization costs with fraud losses is to impose minimum transaction levels below which the merchant will not request an authorization. By this arrangement, the processing costs for all small transactions can be eliminated. Accordingly, in the prior art, merchants are instructed to request authorization from the issuer only if the transaction exceeds a certain defined limit.

This method however, is not satisfactory, since the inflexible limit used by the merchants is not compatible with the different needs of various issuers. For example, if the issuer is fortunate to have cardholders which present little credit loss problems, benefits would be maximized by imposing a high transaction limit on the merchants. By this arrangement, requests for authorization and their associated costs are minimized. In contrast, an issuer having substantial credit and fraud problems would benefit from low limits, such that more transactions are checked. If the latter situation, authorization costs would be substantially higher, but would be offset by reduced losses.

In the prior art practice, the transaction limits supplied to the merchants represent a compromise solution. The issuer, which may pay for the authorization requests, has no control over these limits. Accordingly, it would be desirable to provide a new and improved system wherein the limits or parameters controlling whether a request for authorization is forwarded to the issuer are regulated by each issuer. By this arrangement, each issuer can balance the expense of providing authorization responses with their particular credit and loss problems to operating expenses.

SUMMARY OF THE INVENTION

Accordingly, it is an object of the subject invention to provide a new and improved system for handling requests for authorization of transaction.

It is another object of the subject invention to provide a new and improved system wherein the issuer of bank cards controls the parameters that determine which requests are forwarded to the issuer for authorization.

It is a further object of the subject invention to provide a system wherein each issuer can tailor the parameters governing the forwarding of authorization requests to their own needs.

In accordance with these and many other objects, the subject invention provides for a system wherein the issuer of bank cards can regulate the number and nature of authorization requests which are received from a merchant. As in the prior art, each issuer of bank cards maintains a file containing the account history of each cardholder. The account history can be utilized to determine if a particular purchase should be approved by the issuer. The subject system further includes at least one data control center linked to each of the issuers in the system. The data control center is also linked to each of the merchant member banks which are in turn connected to the individual merchants providing goods and services to the customers.

In accordance with the subject invention, a set of individual parameters is provided to the data control center by each issuer in the system. The set of parameters is used to determine if authorization requests made by a merchant should be forwarded to the particular issuer of the bank card. By this arrangement, the issuer, which bears the costs of the authorization requests, can tailor the parameters to suit its particular needs. For example, an issuer experiencing relatively high credit and fraud losses will benefit from having a high number of requests processed for validity. In contrast, a user having little or no credit and fraud losses, will benefit by substantially reducing the number of authorization requests processed.

In use, a merchant is instructed to request an authorization for all transactions. The authorization requests are electrically routed to the data control center through the merchant member bank. The data control center compares the request with the parameters set by the associated issuer to determine if the request should be forwarded. When the request falls within the particular parameters, it is forwarded to the issuer where it can be evaluated against the account file of the cardholder. A suitable response is then returned to the merchant through the data control center. In the alternative, if the parameters supplied by the issuer indicate that the request should not be forwarded for authorization, the data control center will provide the response. Preferably, the data control center has a master list which includes indisputably void card numbers compiled from data supplied by all the issuers. Thus, if the request is not forwarded to the issuer, it can at least be checked against the master list. By this arrangement, many fraudulent users can be detected even if the transaction falls without the parameters sets by the issuer.

The issuer will typically supply the data control center with a dollar amount over which all transactions are to be forwarded for approval. However, in order to fully satisfy the objects of the subject invention, it is preferred that the parameters include more than just a single transaction level. For example, a second lower limit may also be chosen, below which no transactions are forwarded for authorization. Transactions which fall between the upper and lower limits may be subject to special handling at the control center. More particularly, records can be made of the latter type transactions at the control center such that the activity of the card can be monitored. Approval for subsequent purchases can be denied by the control center based on maximum activity parameters provided by the issuer.

Another type of control parameter which may be used relates to geographical considerations. Due to communication expenses, it is significantly more costly for an issuer to authorize a request from a merchant in a foreign country. Accordingly it would be desirable to permit the issuer to control whether a request should be forwarded based on the location of the merchant. In the preferred embodiment of subject invention, a form of random selection can also be added to the parameters to prevent fraudulent users from avoiding detection, as described more fully hereinbelow.

Further objects and advantages of the subject invention will become apparent from the following detailed description in conjunction with the drawing in which:

BRIEF DESCRIPTION OF THE DRAWING

The sole FIGURE is a block diagram illustrating the new and improved loss control system of the subject invention.

DETAILED DESCRIPTION OF THE PREFERRED EMBODIMENT

Referring to the FIGURE, the subject loss control system 10 will be described in greater detail. In a typical bank card system, customers will apply to an issuer bank 12 for a card. If the issuer determines that a customer meets their requirements, a card is given to the customer and a file is opened which includes the account number associated with the card, as well as credit limits assigned by the issuer. In the alternative, funds may be deposited by the customer to create a debit account. The account information is maintained in some form of data storage means 14, typically an electronic device such as a peripheral disk which can be readily accessed. The information storage means 14 is linked to a computer maintained by the issuer for evaluating authorization requests. The computer will also handle billing functions.

As provided in the prior art, each of the issuers 12 is linked to a data control center 20. The links 22 are typically telephone-type lines suitable for high speed data transmission. The data control center 20 serves as a processing base for transaction information generated by the merchants 30 in the system. As in the prior art, each merchant is associated with a merchant member bank 32. The merchant member bank 32 is linked to both the merchants 30 and data control center 20 via communications lines 34 and 36, respectively. While only one merchant member bank 32 is illustrated in the FIGURE, typically, a plurality of merchant member banks are included within the system, each having a number of merchants associated therewith.

In accordance with the subject invention, a storage means 40, containing parameters provided from each issuer, is connected to control center 20. The parameters are utilized by the data control center 20 to determine if authorization requests, initiated by a merchant 30, should be forwarded to the issuer for approval.

Storage means 40 may be defined by any high speed memory device such as a peripheral disk. Each issuer in the system will provide individual parameters tailored to their specific needs. In the simplest situation, the parameter chosen will be a transaction limit amount. The data control center 20 will forward requests for authorization only if the purchase value exceeds the transaction limit.

To initiate the system, each issuer supplies the chosen parameters to the data control center 20 where they are filed in storage means 40 available for ready access. Preferably, a second storage means 44 is provided having a list of accounts to which a known response can be returned without contacting the issuer. The list, referred to as an exception file, is a compilation of account numbers, supplied by all the issuers, which includes cards reported to be lost or stolen. In addition, the list can also include account numbers representing cardholders whose transactions are to be approved under all circumstances. The exception file is utilized by the data control center 20 when the request for authorization is not forwarded to the issuer.

In the prior art, a merchant would request an authorization if the transaction exceeded a set limit, regardless of issuer preference. In the authorization process, the merchant transmits the transaction information to the the merchant member bank 32 through a telephone or some form of terminal means. If the merchant member bank is, in fact, the issuer of the particular card, the authorization request was handled internally. When the merchant member bank did not issue the card, the transaction information is forwarded to the data control center. The data control center would then attempt to forward the request to the issuer 12 of the card. If the request is forwarded, the issuer can evaluate the transaction against the cardholders's account information in its files 14. The issuer would then send back an acknowledgment to the merchant containing either a denial or approval of the purchase.

In the prior art, if the issuer was unavailable because of communication problems or computer down time, the data control center 20 would supply the response to the merchant. Preferably, an exception file was maintained such that the purchase could at least be checked against the list to determine if, for example, the card was reported lost or stolen. However, in the prior art, if the issuer was available, it would be contacted for each and every transaction exceeding the arbitrarily set limit amount. Accordingly, the issuer of bank cards was unable to balance the costs of authorization against his particular credit and fraud losses.

In contrast, in the subject loss control system 10, each individual issuer is given the capability of tailoring its authorization procedures to its credit and loss situation. More particularly, in the subject system, each merchant 30 may be requested to contact the data control center 20 for every transaction. As in the prior art, the information sent by the merchant through some form of terminal means includes the amount of the transaction, the cardholder account number and the issuer of the card. In accordance with the subject invention, the data control center 20 will extract from storage means 40 the particular parameters supplied by the issuer of the card involved in the transaction. By comparing the transaction with the parameters supplied by the issuer, the data control center will determine whether the transaction should be forwarded to the issuer for approval. In the simplest situation, where the parameters merely consist of a dollar limit, the data control center will forward the request to the issuer for approval if the transaction amount exceeds the dollar level. The issuer can then evaluate the authorization request against the information kept in the cardholder's file 14 to determine if an approval or denial should be returned. The result of the evaluation is routed back to the merchant through the data control center.

As in the prior art, the exception file 44 can be utilized if the issuer cannot be contacted. In addition, the exception file is utilized if the parameters supplied by the issuer indicate that the request should not be forwarded. The use of an exception file can play an important role in the issuer's determination of the parameters supplied to the data control. For example, if a particular issuer has a cardholder population which does not generate credit losses, the issuer can substantially reduce authorization costs. More particularly, the issuer can supply the data control center with a complete list of lost and stolen cards. Further, the issuer can set a relatively high transaction level such that only large transactions are forwarded for approval. By utilizing the exception file, the issuer knows that all lower level transactions will be evaluated to protect against fraud losses. By this arrangement, fraud losses are controlled without high authorization expenses.

In contrast, an issuer having a cardholder population which generates high credit losses, will typically wish to evaluate a greater percentage of transactions. Accordingly, the issuer can supply the data control center with a relatively low transaction limit. By this arrangement, a greater number of requests which are received at the data control center 20 are forwarded to the issuer for approval. Thus, while the expense of authorization will be increased, the issuer can except to reduce its credit losses by detecting improper card usage more frequently.

In the preferred embodiment of the subject invention, the parameters supplied by the issuer will include additional features to enable the issuer to more adequately balance their authorization expenses and credit and fraud losses. For example, the cost of authorizing relatively small transactions, such as those below fifty dollars, far outweigh potential losses. Thus, in the subject invention, the issuer is given the option of selecting an advice limit, below which no transactions are forwarded to the issuer. Similarly, it is cost effective to evaluate all transactions above a certain upper limit. More particularly, high dollar amount transactions, when uncollected, are the most damaging to the issuer. Further, high dollar amount transactions represent only a small fraction of actual bank card usage, such that the expense of authorizing all such transactions is not prohibitive. Thus, a higher transaction limit, hereinafter referred to as the issuer limit, may be supplied by each issuer above which all transactions are forwarded.

Another parameter which may be supplied by the issuer relates to transactions which fall between the upper issuer limit and the lower advice limit. More particularly, while the issuer has determined that the cost of authorizing transactions falling between these limits is not cost effective, he may designate these transactions for special handling. Thus, the issuer may request that the data control center 20 maintain a record of all transactions falling between these limits. Typically, records kept in such a manner are forwarded each day to the issuer in a batch processing procedure. Batch processing is far less expensive than the real time processing of the subject authorization request system. Each day the issuer is supplied with data concerning the activity of particular cardholders such that any unusual patterns can be spotted and corrected. For example, if a cardholder has exceeded his account limits or if the use of the card indicates that it has been stolen, the issuer can place the cardholder account number on the exception file 44 such that all attempted purchases will be denied.

In the prior art, a fraudulent user could lessen the likelihood of detection by restricting his purchases to a level below the transaction limit supplied to the merchants, such that authorization requests which would uncover the fraud were not made. As can be appreciated, in the subject system, since the merchant will request authorization for all transactions, it would be difficult to determine which requests are to be forwarded to the issuer. However, it is possible that through inside information, fraduluent users may obtain the transaction limits set by the issuer.

Accordingly, the subject invention contemplates an additional set of parameters to further inhibit fraudulent activities. More particularly, a random selection feature may be imposed on the issuer selected parameters. For example, the issuer can specify that a percentage of all transactions falling between the advice limit and the issuer limit be randomly selected and forwarded to the issuer for approval. Preferably, the random selection process is weighted such that transactions which are near the upper issuer limit will more likely be selected for processing. By this arrangement, even if the fraudulent user restricts his purchases to a level below the issuer limit, the transaction may still be forwarded to the issuer for approval. The issuer may also specify that a random percentage of transactions, falling below the advice limit, be selected for the type special handling described above. Thus, a percentage of the transactions falling below the advice limit will be recorded in a batch processing method for evaluation by the issuer each day.

Another possible parameter relates to geographical location. As discussed above, the expense of authorization is in part determined by the distance between the data control center 20 and the issuer 12, due to communication costs. An issuer may find it cost effective to authorize certain transactions which occur in nearby regions. In contrast, authorizing the same type of transaction may be prohibitively expensive when the purchase is made by users who are traveling abroad. Thus, the issuer may prefer to limit the forwarding of requests to much higher dollar values, when the transaction is occurring overseas. Accordingly, the issuer may further supply the data control center with parameters specifying that transactions occurring beyond a defined area should not be forwarded for approval.

As pointed out above, communication costs represent a substantial portion of the expense of authorization. Accordingly, in order to enhance the operation of the subject system 10, it is envisioned that a plurality of data control centers 20 be provided, each being located in specific geographical locations throughout the country or the world. Each data control center 20 will be responsible for processing transactions in their local area.

The issuer can supply each data control center with parameters tailored to the location of center. For example, for domestic control centers, the issuer can request that a high percentage of transactions be forwarded for approval. However, with respect to control centers which are located in a foreign country, parameters would be supplied curtailing the number of authorization requests which are forwarded, thereby minimizing costs. The various parameters described above provide flexibility and enable the issuer to accurately tailor the costs of an authorization program with their particular credit and fraud loss problems.

In summary, there is provided a new and improved system for processing requests for authorization of transactions from a merchant wherein the issuer of bank cards regulates the type of requests received. More particularly, each issuer 12 maintains files 14 on their cardholders. A data control center 20 is provided which is linked to the issuer and to the merchants 30. In accordance with the subject invention, the data control center 20 is provided with a storage means 40 containing parameters supplied by each issuer, defining which requests for authorization should be forwarded for approval. In use, a merchant transmits requests for approval for all transactions through a terminal means to the data control center. The data control center then evaluates the requests against the parameters supplied by the issuer. Any request which is forwarded is evaluated by the issuer and an approval or denial is returned to the merchant through the data control center. If the request is not forwarded to the issuer, it may be checked against an exception file 44, which includes a list of indisputably void account numbers. Preferably, the parameters contained in the data control center permit a high degree of flexibility such that the issuer may readily tailor its authorization program with its credit and fraud loss problems.

While the subject invention has been described with reference to a preferred embodiment, it is to be understood that various other changes and modifications could be made therein by one skilled in the art without varying from the scope and spirit of the subject invention as defined by the appended claims. For example, in the future, other types of identification means besides a plastic bank card may be developed to associate a customer with his account. Possibilities include fingerprints and voiceprints which are unique to each individual. It is intended that the scope of the subject invention include various identification data which the merchant will transmit to permit authorization by the issuer.

I claim:

1. A system wherein an issuer of bank cards can regulate the number and nature of authorization requests transmitted thereto from a merchant, said system comprising:

file means, maintained at the location of the issuer and containing information for evaluating a cardholder transaction;

data control center linked to the file means and having a storage means provided with authorization parameters supplied by the issuer, said authorization parameters defining which authorization requests are to be forwarded to the file means of the issuer; and terminal means located at the merchant and linked to the data control center whereby when a request is transmitted by a merchant from the terminal means to authorize a transaction by a cardholder to the data control center, the data control center will only forward the request to the file means at the issuer if the request falls within the authorization parameters maintained in the storage means and supplied by the issuer.

2. A system as recited in claim 1 for use with a plurality of issuers further comprising a plurality of file means associated with each issuer respectively and linked to the data control center, and wherein said storage means of said data control center includes a set of authorization parameters supplied by each issuer.

3. A system as recited in claim 1 for use with a plurality of merchants wherein each merchant is provided with at least one terminal means connected to the data control center via an intermediate network means.

4. A system as recited in claim 1 wherein the data control center further includes an exception file means having a list of cards, supplied by the issuer consisting of accounts to which a proper response can be generated without contacting the issuer such that when the authorization request is not forwarded to the file means of the issuer, the request is evaluated against the information contained in the exception file means.

5. A system wherein an issuer of bank cards can regulate the number and nature of authorization requests transmitted thereto from a merchant, said system comprising:

file means, maintained at the location of the issuer and containing information for evaluating a cardholder transaction;

data control center linked to the file means and having a storage means provided with authorization parameters supplied by the issuer, said authorization parameters defining which authorization requests are to be forwarded to the file means of the issuer;

means located at said data control center and connected thereto, for comparing authorization requests with the authorization parameters supplied by the issuer; and terminal means located at the merchant and linked to the data control center whereby when a request is transmitted by a merchant from the terminal means to the comparison means of the data control center for authorizing a transaction by a cardholder, the data control center will only forward the request to the file means at the issuer if the request falls within the authorization parameters maintained in the storage means and supplied by the issuer.

6. A method of processing requests for authorization of transactions from a merchant wherein the issuer of the bank cards regulates the number and nature of requests received comprising the steps of:

providing a data control center linked to said issuer and said merchant;

supplying said data control center with authorization parameters for said issuer;

transmitting the authorization requests from said merchant to said data control center;

comparing said authorization requests with the parameters of the issuer at the data control center;

forwarding said authorization requests to the issuer only when the request falls within the parameters supplied by the issuer;

evaluating any forwarded requests at the issuer's location; and transmitting a response to the merchant, wherein said response is generated by the data control center if the request was not forwarded to issuer and with the response being generated by the issuer if the request was forwarded.

7. A method as recited in claim 6 wherein requests which are not forwarded to the issuer are evaluated against an exception file maintained at the data control center, the exception file containing a list of accounts to which a proper response can be generated without contacting the issuer.

8. A method as recited in claim 6 wherein the authorization parameters include an issuer limit amount whereby only transactions exceeding the issuer limit amount will be forwarded to the file means at the issuer for authorization.

9. A method as recited in claim 8 wherein the authorization parameters further include an advice limit amount such that any transactions falling below the advice limit amount are not forwarded to the issuer for authorization and wherein any transactions falling between the issuer limit and the advice limit may be specially handled.

10. A method as recited in claim 9 wherein transactions falling between the issuer limit and the advice limit are recorded for later processing.

11. A method as recited in claim 10 wherein said comparing step at the data control center includes the random selection of a percentage of transactions having a dollar value below the issuer limit with the selected transactions being forwarded to the issuer for approval.

* * * * *